Aug. 26, 1969 A. BILL 3,463,498
FLUID SEAL DEVICE
Filed Nov. 2, 1967 3 Sheets-Sheet 3

Inventor
Arthur Bill
By Cushman, Darby & Cushman
Attorneys

United States Patent Office 3,463,498
Patented Aug. 26, 1969

3,463,498
FLUID SEAL DEVICE
Arthur Bill, Derby, England, assignor to Rolls-Royce Limited, Derby, England, a British company
Filed Nov. 2, 1967, Ser. No. 680,104
Claims priority, application Great Britain, Nov. 24, 1966, 52,722/66
Int. Cl. F16j 15/54, 15/44
U.S. Cl. 277—138    11 Claims

ABSTRACT OF THE DISCLOSURE

A gas turbine engine has its compressor casing sealed to its combustion equipment by a seal device in which a resilient packing of fibrous metallic material forces a sealing ring into a sealing position.

This invention relates to fluid seal devices.

According to the present invention there is provided a fluid seal device comprising a sealing ring having an annular or cylindrical sealing surface, a support member having a circumferential channel therein which receives the sealing ring, and a resilient packing of fibrous metallic material which extends circumferentially in said channel and is in continuous circumferential contact with the sealing ring to urge said sealing surface thereof into sealing engagement with a surface to be sealed.

The fibrous metallic material may comprise compressed woven metal wires, or diffusion bonded metal fibres or resin bonded metal fibres.

The resilient packing may be so arranged in the circumferential channel, that the sealing force exerted thereby on the sealing ring has both an axial and a radial component.

In one embodiment of the invention the sealing ring is located in the circumferential channel with both axial and radial clearance, and respective resilient packings are disposed in said clearances to urge the sealing ring axially and radially respectively into sealing engagement with an annular wall of said channel and a cylindrical surface, respectively.

The surface to be sealed may be the internal surface of a cylinder, the sealing ring being urged radially outwardly into sealing engagement therewith. Alternatively, the surface to be sealed may be the external surface of a cylinder, in which case the sealing ring is urged radially inwardly into sealing engagement therewith.

The invention finds particular application to a gas turbine engine. Thus, the invention also provides a gas turbine engine having in flow series compressor equipment, combustion equipment and turbine equipment, respective casings containing said equipments, a seal device disposed between the compressor equipment casing and the combustion equipment casing, the seal comprising a sealing ring having an annular sealing surface, one of said casings having a circumferential channel therein which receives the sealing ring, and a resilient packing of fibrous metallic material which extends circumferentially in said channel and is in continuous circumferential contact with the sealing ring to urge said sealing surface thereof into sealing engagement with the other casing.

The said other casing may be cylindrical and is disposed within the said one casing.

The said other casing may be the compressor equipment casing.

Figure 1:
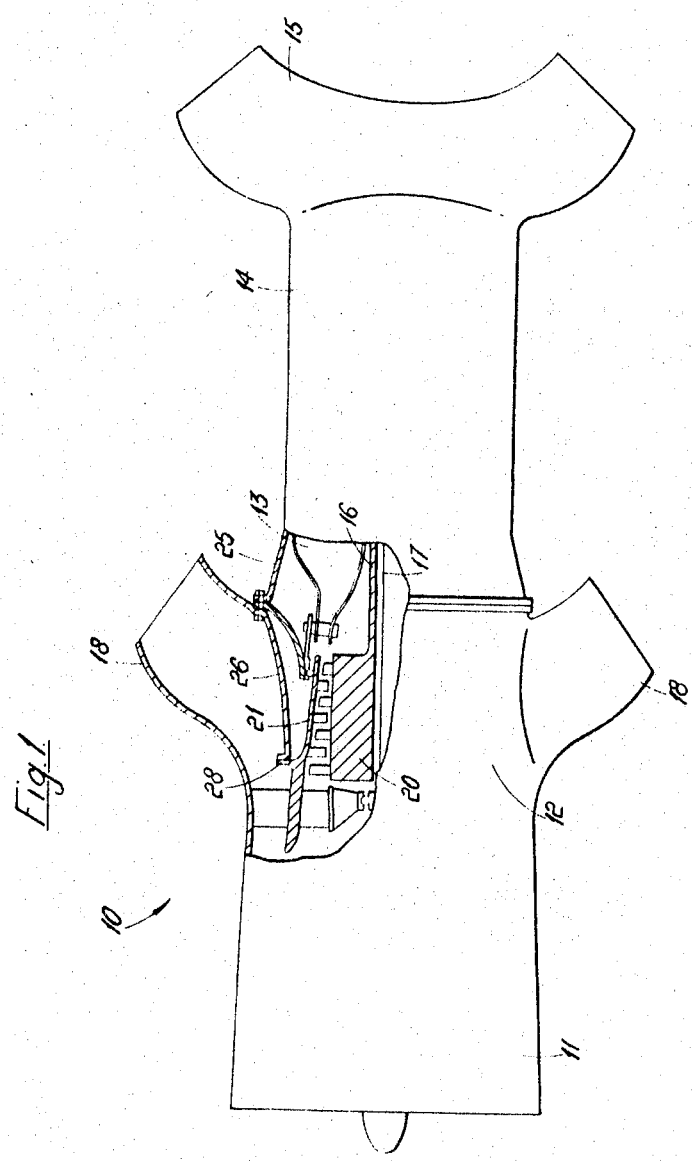
Figure 2:
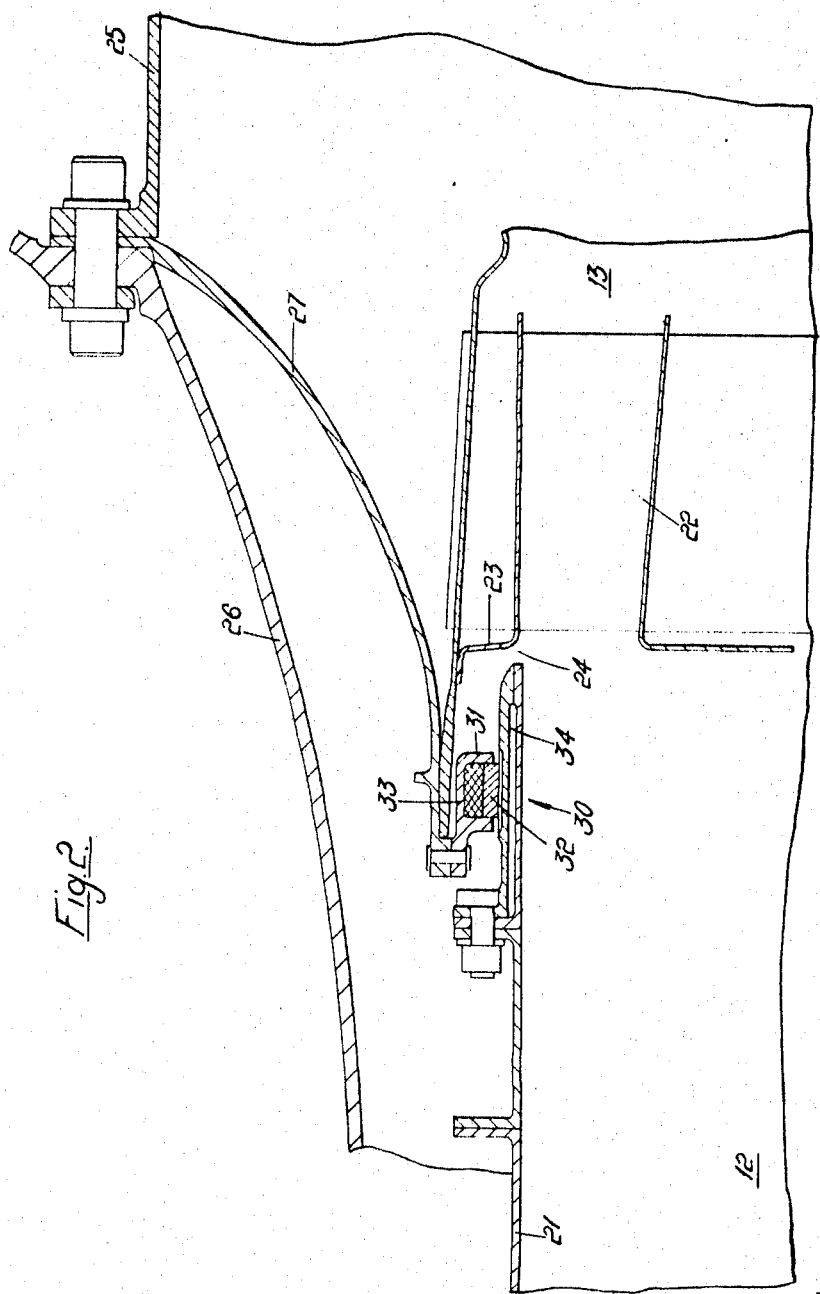

The invention will be described, merely by way of example, with reference to the accompanying drawings, in which:

FIGURE 1 is a partially sectioned diagrammatic plan view of a gas turbine engine incorporating a fluid seal device according to the invention, FIGURE 2 is a diagrammatic axial section through part of the gas turbine engine shown in FIGURE 1, illustrating the fluid seal device therein, and FIGURES 3 to 8, inclusive, illustrate different respective exemplifications of fluid seal devices according to the invention.

Referring to the drawings, FIGURE 1 shows a gas turbine engine 10 of the so-called "two-spool" type, comprising in flow series a low pressure axial flow compressor 11, a high pressure axial flow compressor 12, combustion equipment 13, turbine means 14 and a jet pipe 15, the jet pipe 15 being in this instance bifurcated. The turbine means 14 comprise a high pressure turbine and a low pressure turbine in flow series drivingly connected via respective coaxially arranged shafts 16, 17 to the high pressure compressor 12 and low pressure compressor 11 respectively. Part of the air compressed by the low pressure compressor 11 is directed to atmosphere through two auxiliary nozzles 18 disposed on opposite diametrical sides of the engine 10 outwardly of the high pressure compressor 12.

The high pressure compressor 12 comprises a plurality of successive stages of rotor blades mounted on a common rotor 20, the stages of rotor blades alternating with stages of fixed stator blades which are secured at their radially outer ends to a high pressure compressor casing 21.

It will be appreciated that the pressures internally and externally of the high pressure compressor casing 21 will be markedly different, particularly at the downstream end of the high pressure compressor 12, which communicates with the upstream end of the combustion equipment 13. It is important, therefore, to provide an effective fluid seal externally of the high pressure compressor casing 21. Such a seal is effected by a seal device according to the present invention, as illustrated in the diagrammatic sectional view of FIGURE 2.

In FIGURE 2 part of the high pressure compressor casing 21 is shown, but the stator and rotor blades of the high pressure compressor 12 have been omitted in the interests of clarity. A row of compressor outlet guide vanes 22 is provided at the upstream end of the combustion equipment 13, the guide vanes 22 being mounted in combustion equipment supporting structure 23. The combustion equipment supporting structure 23 and the high pressure compressor casing 21 have to withstand substantially different temperatures in use, and accordingly they will generally be made of different materials. An axial clearance 24 is therefore provided between the downstream end of the high pressure compressor casing 21 and the combustion equipment supporting structure 23 to allow for relative expansion and contraction in operation of the engine 10.

The engine 10 has a main casing 25 from which the high pressure compressor casing 21 is supported by means of two intermediate annular walls 26, 27 attached respectively to the upstream and downstream ends of the compressor casing 21. The forward intermediate wall 26 defines the inner boundary of the gas ducts leading to the auxiliary nozzles 18, the wall 26 being secured to the upstream end of the compressor casing 21 by means of a flanged joint 28 (FIGURE 1).

The downstream intermediate wall 27 engages the downstream end of the high pressure compressor casing 21 by way of a seal device 30. Thus the downstream intermediate wall 27 extends forwardly and has attached thereto at its forward end an annular channel-section support member 31 formed with a circumferential radially inwardly facing channel of rectangular cross section which encircles the downstream end of the high pressure compressor casing 21 with a radial clearance.

A spilt annular sealing ring 32 is located within the channel member 31 and held against axial movement by the circumferential side walls of the support member 31. A resilient packing 33 fills the channel within the support member 31 and extends circumferentially therein behind the sealing ring 32. The resilient packing 33 comprises fibrous metallic material for example, material formed of compressed woven metal wires, such that it exerts a radially inward force on the sealing ring 32 to urge the latter into sealing engagement with an outer cylindrical surface 34 provided on the downstream end of the high pressure compressor casing 21 or on a member secured thereto.

A suitable material for the resilient packing 33 is the compressed woven metal wire material manufactured under the trademark "Vibrashock." Alternatively, diffusion bonded metal fibres or resin bonded metal fibres may be employed in the packing 33.

The effect of the packing 33 is to exert a resilient radially inward force on the piston ring 32 throughout its circumferential length, thereby ensuring a uniform sealing pressure on the sealing ring 32. In addition, the packing 33 affords a substantial degree of vibration damping between the high pressure compressor casing 21 and the combustion equipment supporting structure 23.

Figure 3:
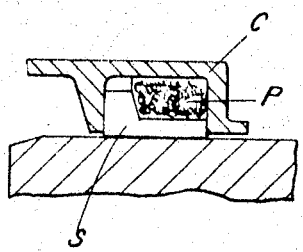
Figure 4:
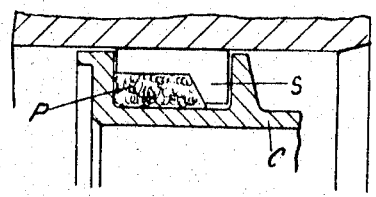
Figure 5:
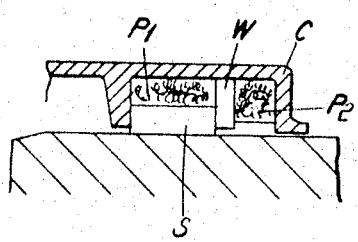
Figure 6:
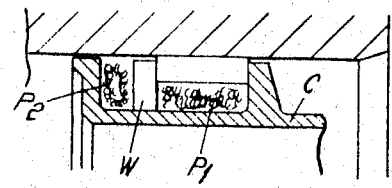
Figure 7:
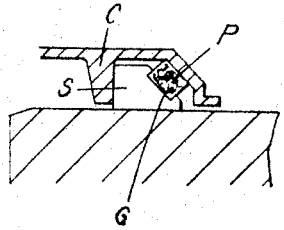

It will be appreciated that the seal device according to the present invention is applicable to the sealing of both external and internal cylindrical surfaces, as illustrated by way of example in FIGURES 3 to 8 inclusive. In each of these figures the circumferential channel supporting the seal device is indicated at C, the split sealing ring at S and the resilient packing at P. In FIGURES 3, 5 and 7, the seal device is applied to an external cylindrical surface to be sealed while in FIGURES 4, 6 and 8, seal devices corresponding to those of FIGURES 3, 5 and 7 respectively are applied to an internal cylindrical surface to be sealed.

In FIGURES 3 and 4 the sealing ring S has an integral portion which is wedge-shaped in axial section, so that the resilient packing P exerts a sealing force having both an axial and a radially inward component. Sealing is therefore effected radially inwardly against the surface to be sealed and axially against one of the circumferential side walls of the channel C.

In FIGURES 5 and 6 the resilient packing comprises two parts $P_1$, $P_2$. The packing $P_1$ exerts a radially inward force on the sealing ring S, while the packing $P_2$ is disposed against one of the circumferential side walls of the channel C and exerts an axial force on the sealing ring S by way of radially extending annular washer W to urge the sealing ring S into sealing engagement with the other circumferential side wall of the channel C.

Figure 8:
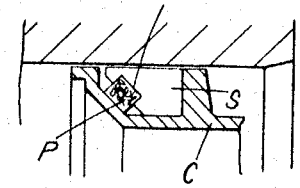

In FIGURES 7 and 8 the sealing ring S has a circumferential face which, in axial section, is inclined to the axis of symmetry of the sealing ring S. This face is formed with a circumferential groove G in which the resilient packing P is received. The channel C is correspondingly shaped so that the packing P exerts a sealing force on the sealing ring S which is inclined to the axial direction and which has, therefore, a component both in the radially inward direction and in the axial direction.

The seal device according to the invention as described above is particularly useful in applications where the diameter of the cylindrical surface to be sealed is large in relation to the radial thickness of the sealing ring.

I claim:
1. A fluid seal device subject to extremely elevated temperatures and comprising a sealing ring having an annular sealing surface, a support member having a circumferential channel therein which receives the sealing ring, and a resilient packing of fibrous metallic material which extends circumferentially in said channel and is in continuous circumferential contact with the sealing ring to urge said sealing surface thereof into sealing engagement with a surface to be sealed.

2. A device according to claim 1 in which the fibrous metallic material comprises compressed woven metal wires.

3. A device according to claim 1 in which the fibrous metallic material is comprised of diffusion-bonded metal fibres.

4. A device according to claim 1 in which the fibrous metallic material is comprised of resin-bonded metal fibres.

5. A device as claimed in claim 1 in which the resilient packing exerts on the sealing ring a sealing force which has both an axial and a radial component.

6. A device as claimed in claim 1 in which the sealing ring is located in the circumferential channel with both axial and radial clearance, and respective resilient packings are disposed in said clearances to urge the sealing ring axially and radially respectively into sealing engagement with an annular wall of said channel and a cylindrical surface, respectively.

7. A device as claimed in claim 1 in which the surface to be sealed is the internal surface of a cylinder and the sealing ring is urged radially outwardly into sealing engagement therewith.

8. A device according to claim 6 in which the surface to be sealed is the external surface of a cylinder and the sealing ring is urged radially inwardly into sealing engagement therewith.

9. A gas turbine engine having in flow series compressor equipment, combustion equipment and turbine equipment, respective casings containing said equipments, a seal device disposed between the compressor equipment casing and the combustion equipment casing and subject to extremely elevated temperatures, said seal device comprising a sealing ring having an annular sealing surface, one of said casings having a circumferential channel therein which receives the sealing ring, and a resilient packing of fibrous metallic material which extends circumferentially in said channel and is in continuous circumferential contact with the sealing ring to urge said sealing surface thereof into sealing engagement with the other casing.

10. A gas turbine engine as claimed in claim 9 wherein the said other casing is cylindrical and is disposed within the said one casing.

11. A gas turbine engine as claimed in claim 10 wherein the said other casing is the compressor equipment casing.

References Cited

UNITED STATES PATENTS

| 1,483,812 | 2/1924 | Isakson | 277—138 X |
| 1,826,967 | 10/1931 | Thomas | 277—120 |
| 2,652,685 | 9/1953 | Willgoos | 60—11 |

LOUIS K. RIMRODT, Primary Examiner

U.S. Cl. X.R.

60—11